Patented Apr. 3, 1928.

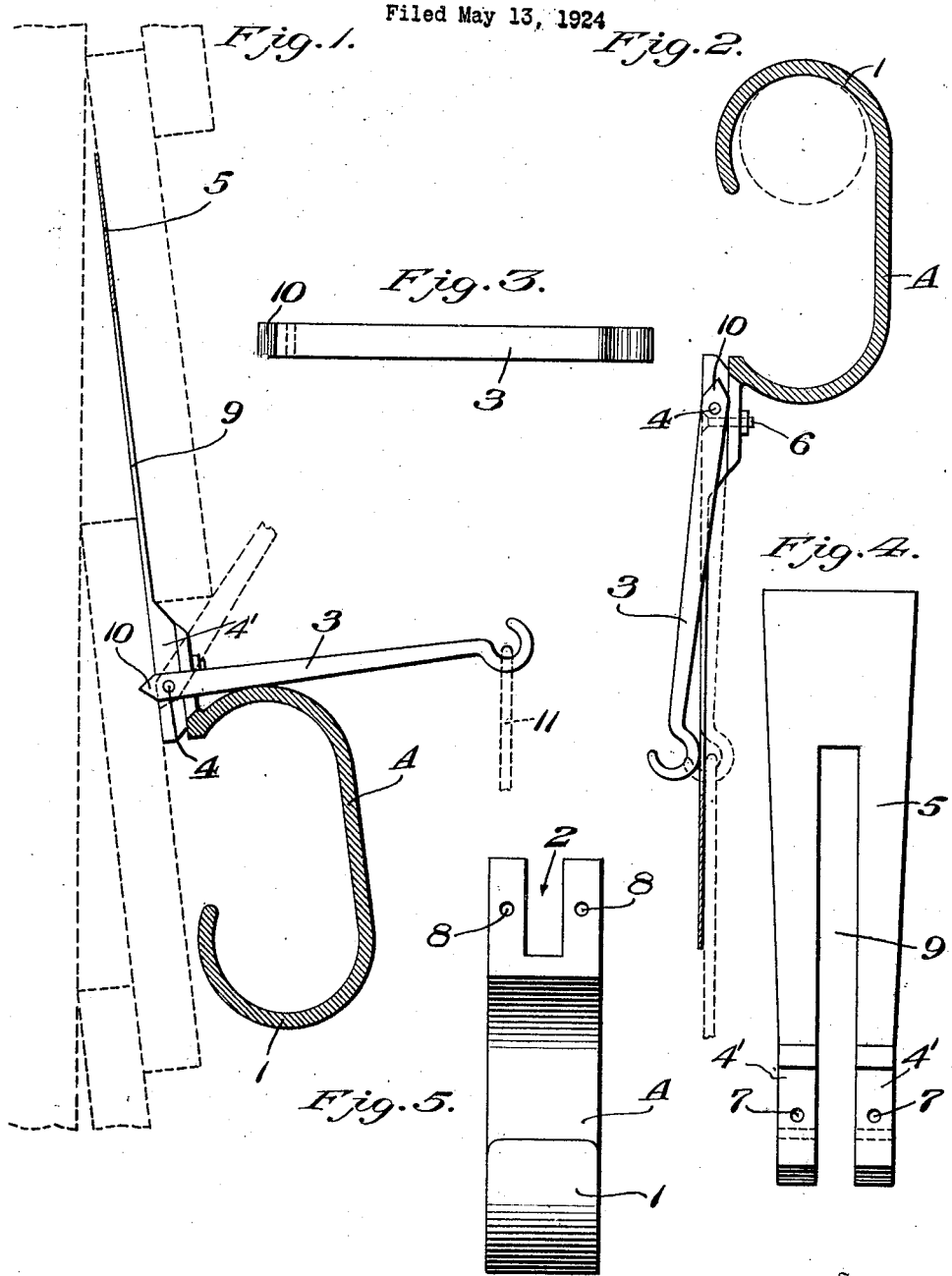

1,664,902

UNITED STATES PATENT OFFICE.

CLARK SEELEY, OF OTISVILLE, MICHIGAN.

COMBINED PUTTY KNIFE AND PAINT HOOK.

Application filed May 13, 1924. Serial No. 713,066.

My invention relates to an improved putty knife and paint-hook combined.

The principal advantage of this tool resides in its applicability to use on shingle roofs, especially when painting the roof or sides and cornice of shingle dormer-windows.

This invention includes a putty-knife and a hook for holding a paint-pot in convenient position either from the side of the house, roof, ladder, or what not.

In the accompanying drawings:—

Fig. 1 is a side view partly in section showing the application of my improved device, either to a shingle roof or clap-boards on the sides of a house;

Fig. 2 is a side view partly in section of the tool in a different position;

Fig. 3 is a plan view of the hook;

Fig. 4 is a side elevation of the putty-knife; and

Fig. 5 is a side elevation of the combined handle and hook.

A represents a handle having a hook 1 at one end adapted for fastening over the round, for example, of a ladder, as indicated in dotted lines in Fig. 2. The opposite end of the handle is provided with a slot 2 to afford clearance for the hook 3, which is pivoted at 4 between the abutments 4' formed on the putty-knife 5.

The putty-knife 5 is secured to the handle by bolts or other means 6, passing through holes 7 and 8 in the abutments 4' of the putty-knife and handle respectively.

The putty-knife is divided throughout the greater portion of its length by a slot 9 at its inner end which registers with the slot 2 in the handle to afford clearance for the pivoted hook 3 when swung back into the position indicated by dotted lines in Fig. 2.

The short end of the hook is provided with a V-shaped projection 10 adapted to be forced into the weatherboarding or shingle as a means for holding the putty-knife placed between the weatherboarding or shingles, as shown in Fig. 1, and at the same time help hold the hook 3 in position while resting upon the handle A and supporting the bail 11 of a paint-pot.

When the putty-knife is used for puttying, the hook 3 is swung back out of the way; and when paintng weatherboarding or shingles, the putty-knife is forced up between the weatherboarding or shingles as shown in Fig. 1, and the hook 3 is drawn down from the position of the dotted lines to that of the full lines resting upon the handle A, holding the pot of paint out from the side of the building or slope of the roof.

When the paint-pot is suspended from the round of a ladder, the hook may be forced back through the opening 9 in the putty-knife, the hook being shorter than the length of the slot 9; and when the bail 11 of the paint-pot is hung thereon, the putty-knife forms a lock to prevent its escape, as shown in dotted lines in Fig. 2.

This furnishes a very simple, complete, and satisfactory tool, which has proved very useful to painters when working in places where both hands are needed; and with its use there is no danger of the paint being spilled, or the paint-pot falling to the ground.

I claim:—

1. A device of the character described including a handle, a putty-knife secured thereto, and having a slot therein extending substantially from the point of connection with the handle toward the end thereof, and a hook pivoted in said slot and being shorter than the length of said slot for swinging movement therethrough.

2. A device of the character described including a handle having a slotted end, a putty-knife having a slotted end secured thereto and registering with the slotted end of said handle, and a hook pivoted in the slotted end of the putty-knife and being shorter than the length of the slot therein to pivotally swing through the slots in the putty-knife and handle.

3. A device of the character described including a putty-knife having a slot in the inner end thereof extending substantially throughout the major portion of the length thereof, said inner end having abutments formed thereon on opposite sides of the slot, a handle having a slotted end secured upon the abutments with the slot thereof registering with the slot in the putty-knife, and a hook pivotally supported by the abutments in the slotted end of the putty-knife and being shorter than the length of the slot therein for swinging movement through the slots in the putty-knife and handle.

In testimony whereof I affix my signature.

CLARK SEELEY.